US008366171B2

(12) United States Patent
Pond

(10) Patent No.: US 8,366,171 B2
(45) Date of Patent: Feb. 5, 2013

(54) VEHICLE ENCLOSURE APPARATUS

(75) Inventor: Phillip Pond, Brooklyn, NY (US)

(73) Assignee: Pond I Corp., Brooklyn, NY (US)

( * ) Notice: Subject to any disclaimer, the term of this patent is extended or adjusted under 35 U.S.C. 154(b) by 0 days.

(21) Appl. No.: 13/236,533

(22) Filed: Sep. 19, 2011

(65) Prior Publication Data

US 2012/0068489 A1   Mar. 22, 2012

Related U.S. Application Data

(60) Provisional application No. 61/384,256, filed on Sep. 18, 2010.

(51) Int. Cl.
*B62J 17/00* (2006.01)

(52) U.S. Cl. ..................................................... 296/78.1

(58) Field of Classification Search .............. 296/78.1; 40/584, 590

See application file for complete search history.

(56) References Cited

U.S. PATENT DOCUMENTS

| 490,229 | A |   | 1/1893  | Hohenstein |  |
|---|---|---|---|---|---|
| 550,709 | A | * | 12/1895 | Dietrich et al. | 135/88.03 |
| 601,977 | A | * | 4/1898  | McDonald | 135/88.04 |
| 691,964 | A | * | 1/1902  | Olding | 135/88.04 |
| 726,610 | A |   | 4/1903  | Zech |  |
| 988,349 | A | * | 4/1911  | Jolley | 135/88.03 |
| 3,945,336 | A | * | 3/1976  | Harris | 116/28 R |
| D245,903 | S |   | 9/1977  | Harris, Jr. |  |
| 4,346,725 | A |   | 8/1982  | Shaw |  |
| 6,402,220 | B2 |  | 6/2002  | Allen |  |
| 6,565,139 | B2 | * | 5/2003  | Bayerle et al. | 296/77.1 |
| 6,718,697 | B2 | * | 4/2004  | Voorhees | 52/79.4 |
| 6,802,327 | B2 | * | 10/2004 | Koss | 135/88.08 |
| 6,811,204 | B2 | * | 11/2004 | Long | 296/102 |
| 6,817,647 | B1 | * | 11/2004 | Green | 296/77.1 |
| D520,937 | S | * | 5/2006  | Eisenhauer | D12/401 |
| 7,090,279 | B2 |   | 8/2006  | Tahara |  |
| 7,708,339 | B2 | * | 5/2010  | Zapater | 297/184.11 |
| 2008/0048413 | A1 | * | 2/2008  | Salinas et al. | 280/304.3 |

* cited by examiner

*Primary Examiner* — H Gutman

(57) ABSTRACT

A vehicle-mountable structure is disclosed. Said structure is adapted to substantially conceal a vehicle and operator in an enclosure and provide in a visually attractive appearance. The enclosure is supported by a hierarchy of beams capable of attaching to a vehicle frame in a manner that does not interfere with vehicle operations.

20 Claims, 16 Drawing Sheets

VEHICLE ENCLOSURE APPARATUS

CROSS REFERENCES TO RELATED APPLICATIONS

This application claims the benefit of Applicant's prior provisional application, application No. 61/384,256, filed on Sep. 18, 2010.

FIELD OF INVENTION

The invention relates to vehicle-mountable structures.

BACKGROUND

The invention relates to vehicle-mountable structures and enclosures adapted to substantially conceal a vehicle. Concealing a substantial portion of the vehicle and operator in the enclosure creates a striking visual appearance. Messages may be written on the enclosure to take advantage of this attention.

Creating such a structure presents several challenges. For example, when mounted on a vehicle, the structure should not substantially interfere with the operation of the vehicle. The structure should not substantially interfere with an operator's ability to mount or dismount the vehicle. The structure should be adjustable to fit vehicles of different sizes. The structure should be collapsible for shipping, sales, and storage. The structure should be able to cover substantially all of a vehicle upon which it is mounted, while allowing the vehicle's wheels to maintain contact with the road and the vehicle's driver to safely view the road and other traffic.

SUMMARY

A visually attractive appearance is created through a lightweight, collapsible, framework adjustably mountable upon vehicles of varying size, and an enclosure capable of substantially concealing a vehicle. The framework and enclosure does not substantially interfere with vehicle operations. The structure may include a plurality of clamping mechanisms, rigid frame elements, flexible pole elements and an "Enclosure Skin."

In a preferred embodiment, the structure is mountable upon a bicycle. Other embodiments may be mountable upon motorcycles, tricycles, scooters, dirt bikes, or similar narrow vehicles.

In one embodiment, the structure includes a plurality of clamping mechanisms, "Primary Frame" elements, "Secondary Frame" elements, flexible "Tertiary Frame" elements, and an inelastic Enclosure Skin. In a preferred embodiment, rigid Primary Frame elements are adapted to clamp to a vehicle; one substantially "H" shaped Secondary Frame element is removably secured to each ends of the Primary Frame, a plurality of notches along the outer edges are adapted to accept Tertiary Frame elements; and an Enclosure Skin is removably secured to the Tertiary Frame through a plurality of sleeves, pockets or clips.

The structure includes a Primary Frame element mountable upon a vehicle frame. The Primary Frame provides a rigid structure to securely clamp a vehicle frame. In a preferred embodiment, the Primary Frame runs parallel to the length of the vehicle, attaching to the vehicle frame below the vehicle's steering mechanism (the "Headtube") and below the vehicle's seat (the "Seattube").

The Primary Frame may extend beyond the front and rear of the bicycle frame as necessary to support Secondary Frame elements and/or the Enclosure Skin. In another embodiment, the Primary Frame element extends beyond the Headtube and Seatube by 0 to 30% of the "toptube length" (the "toptube length" being the distance between the steering mechanism and seat). In a third embodiment, Primary Frame element clamps are unconnected by a direct structural beam.

In a preferred embodiment, a rigid Secondary Frame is removably mountable to the Primary Frame. Secondary Frame elements extend away from the Primary Frame, providing an armature adapted to receive Tertiary Frame elements.

The Secondary Frame may take a variety of different shapes, including an "H" shape or an "X" shape. One or more secondary frames may be secured to the Primary Frame, or the Primary and Secondary Frame may be fused as one element. In a preferred embodiment, one substantially "H" shaped Secondary Frame element is attached to a forward portion of the Primary Frame, and one substantially "H" shaped Secondary frame element is attached to a rear portion of the Primary Frame.

A plurality of "Tertiary Frame" elements are removably mountable to the Secondary Frame. Tertiary Frame elements provide a lightweight, flexible structure to shape the Enclosure Skin.

The Enclosure Skin, when mounted to a vehicle, conceals a substantial portion of the vehicle and vehicle-operator, resulting in a striking visual appearance.

Decorative elements may be attached to the Enclosure Skin. In a "Fish Bike" embodiment, the decorative elements include fins, lips, eyes and colorful scales. In addition, a "dorsal fin" may be attached to a rider's helmet to further replicate a fishy appearance. The Enclosure Skin may also provide a surface to attach lighting (such as LEDs); exterior graphics, information or advertisements; or may itself be fabricated with pre-printed signage.

DETAILED DESCRIPTION AND PREFERRED EMBODIMENT

Figure 1:
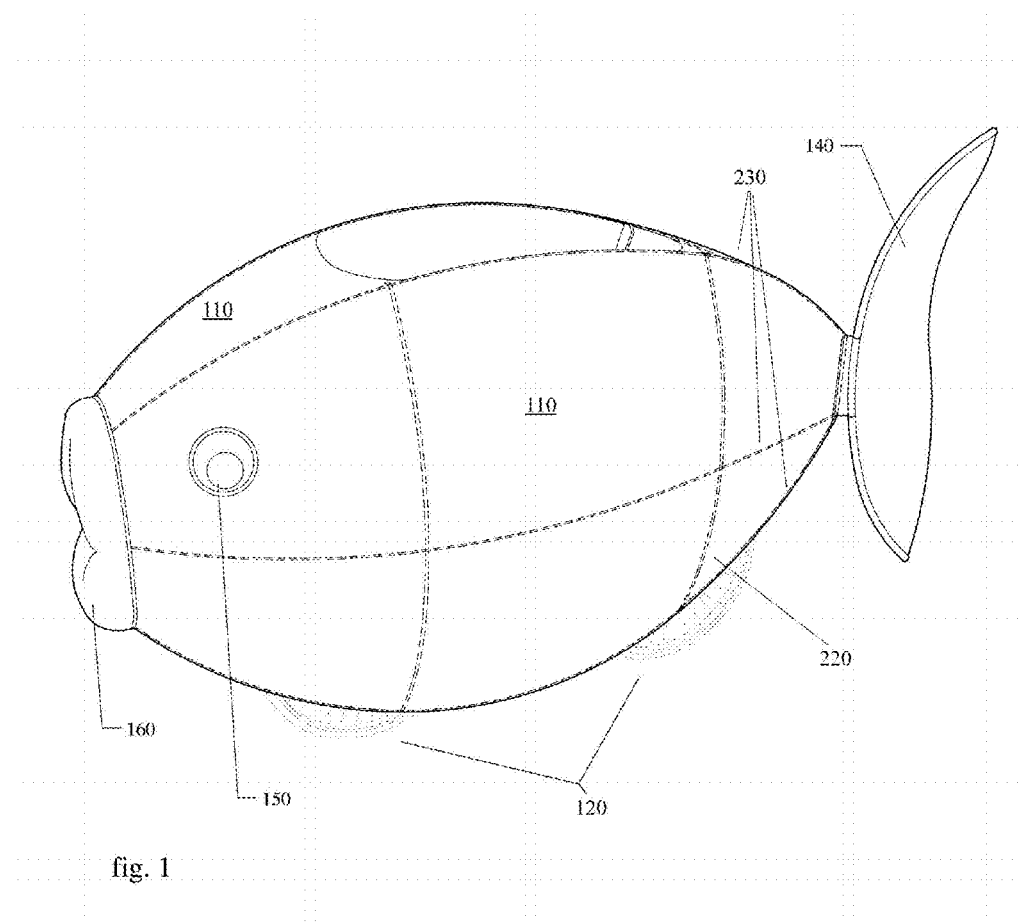
FIG. 1 illustrates the an external view of the enclosure, with decorations, mounted upon a vehicle.

FIG. 1 depicts the external appearance of the preferred embodiment: a fish costume for a bicycle. When mounted to a bicycle, the bicycle is substantially concealed by the Enclosure Skin 110. Decorative elements such as eyes 150, lips 160, and tail fins 140 may be added to complete the fish disguise. The external appearance is shaped by a series of Secondary Frame elements 220 and Tertiary Frame elements 230 shown as broken lines in FIG. 1. Portions of the vehicle 120 may be visible beneath the structure, but are shown in broken lines to indicate they are not part of the invention.

Figure 2:
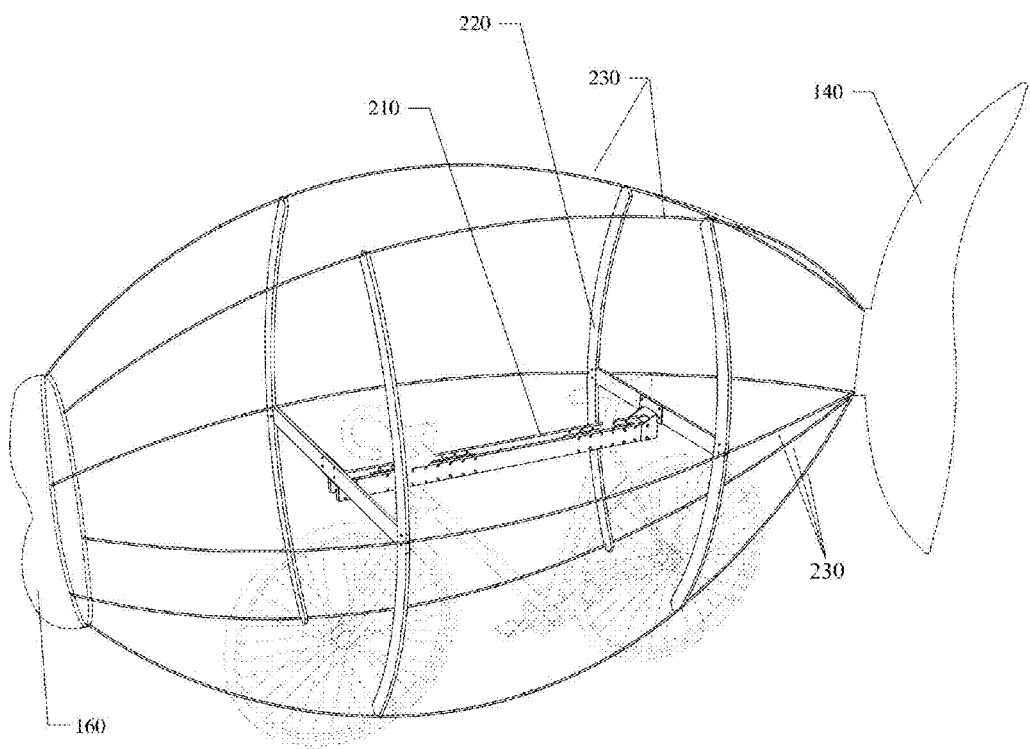
FIG. 2 illustrates the overall apparatus with the Enclosure Skin removed for clear view of internal elements.

FIG. 2 depicts the internal structure of the preferred embodiment. The structure includes a Primary Frame element 210, a plurality of Secondary Frame elements 220, and a plurality of Tertiary Frame elements 230.

The Primary Frame element 210 is adapted to securely mount to a vehicle 120 at a forward point below the vehicle's steering mechanism 230, and a rear point below the vehicle's seat 235.

Figure 3:
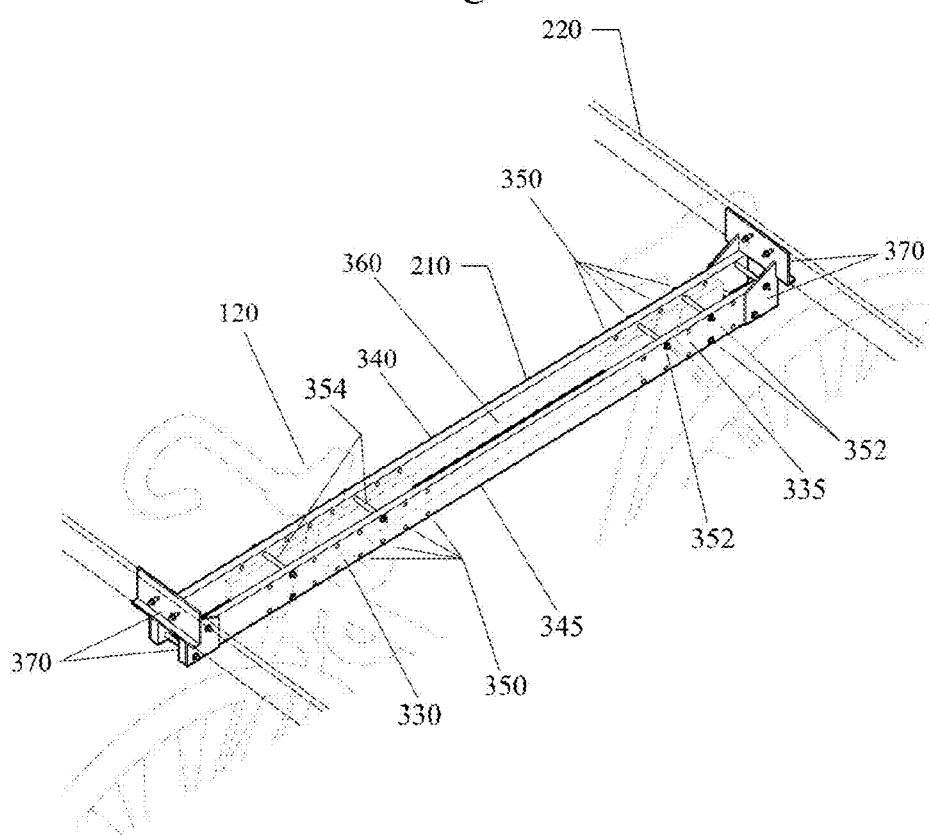
FIG. 3 illustrates a Primary Frame embodiment with intermediate length beams.

FIG. 3 depicts a Primary Frame. In a preferred embodiment, the Primary Frame element is made of two beams 340, 345. The beams are mountable to a vehicle 120 such that they are approximately parallel to the ground and their length runs in the direction of straight vehicle travel. A vehicle frame 120 may be pinched between the two beams 340, 345 to securely join the structure and vehicle.

A plurality of sockets 350 are distributed along the length of the Primary Frame elements 340, 345. The clamping force may be supplied by inserting and tightening bolts at sockets 350 near the mounting points 330, 335. Since vehicle frames come in a variety of sizes, sockets at appropriate positions may be selected to secure a particular vehicle. Spacers 354 may be inserted between the Primary Frame elements 340, 345 to ensure the Primary Frame clamps to the vehicle securely, but without damaging the vehicle.

In an embodiment where the structure is attached to a bicycle, the Primary Frame elements 340, 345 may mount at approximately the same height as the vehicle's top tube 360.

In the preferred embodiment, the Primary Frame extend only as far beyond the ends of the vehicle mounting points to provide an anchor point for the Secondary Frame elements. Brackets 370 may be added to the junction between Primary and Secondary Frame elements to stiffen the connection.

Figure 4:
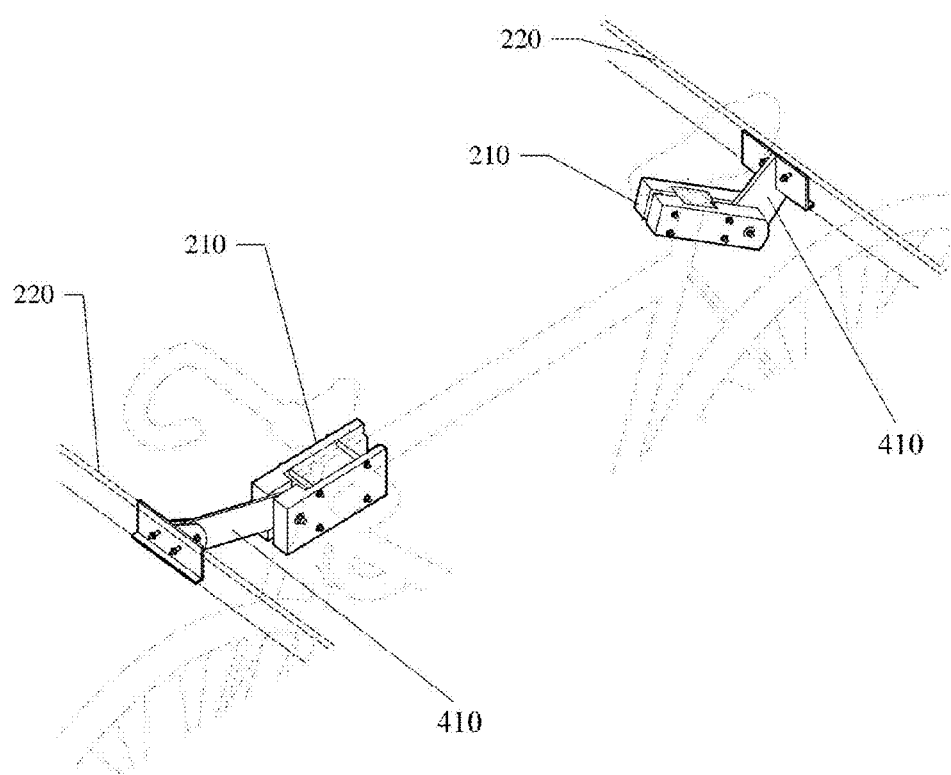
FIG. 4 illustrates a "clamp only" Primary Frame configuration.

FIG. 4 depicts another embodiment, where the Primary Frame elements 210 are not directly connected by a structural beam running between the vehicle mount points 330, 335. Instead, the Primary Frame elements 210 are individual clamping mechanisms with adjustable-angle armatures 410 adapted to secure Secondary Frame elements 210.

Figure 9:
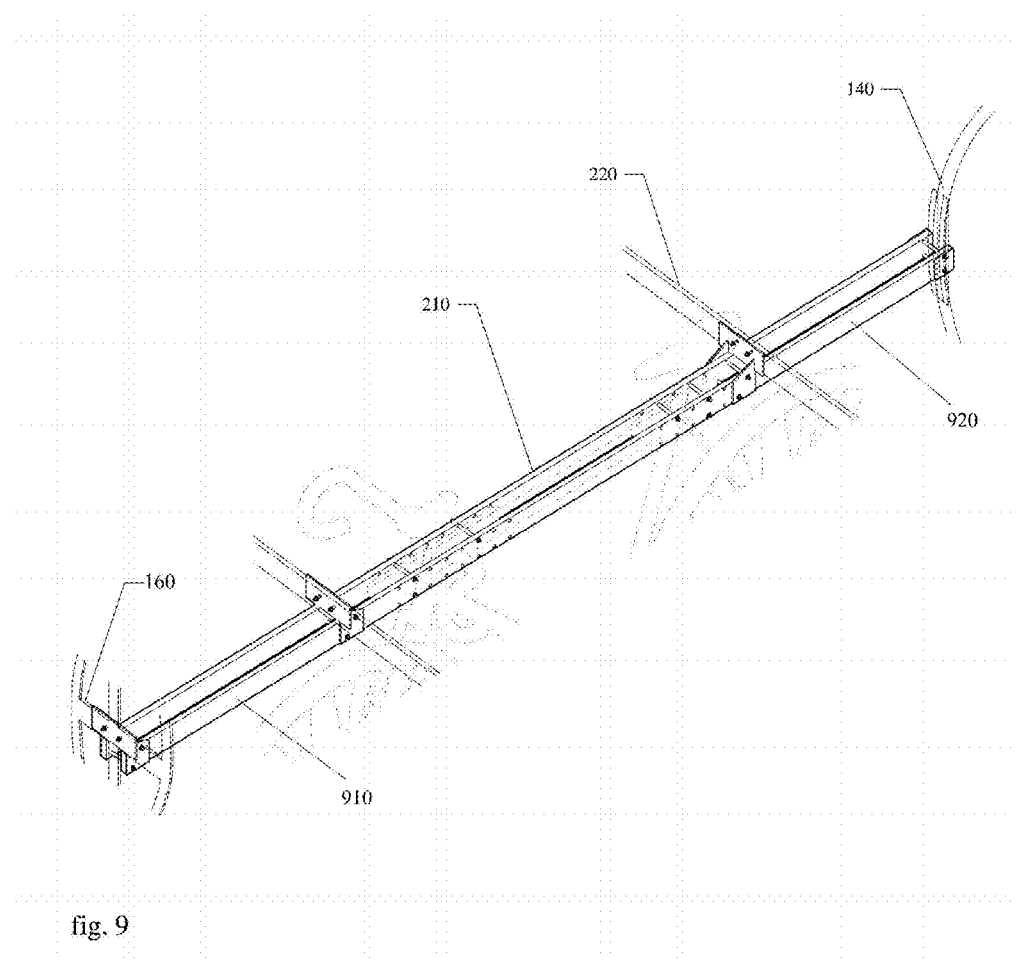
FIG. 9 illustrates a Primary Frame embodiment with a full length beam.

FIG. 9 depicts a third primary frame embodiment where the Primary Frame 210 extends beyond the front 910 and rear 920 of the vehicle frame to reach Enclosure Skin 110.

A plurality of Secondary Frame elements extend away from the Primary Frame providing an armature to support Tertiary Frame elements. The Secondary Frame elements extend far enough from the vehicle frame to support the Enclosure Skin (either directly or through Tertiary Frame elements) without substantially interfering with vehicle operation. Secondary Frame elements may be made from wood, fiberglass, aluminum, carbon fiber, or similar lightweight material of sufficient stiffness to support the remaining frame members and enclosure.

Figure 10:
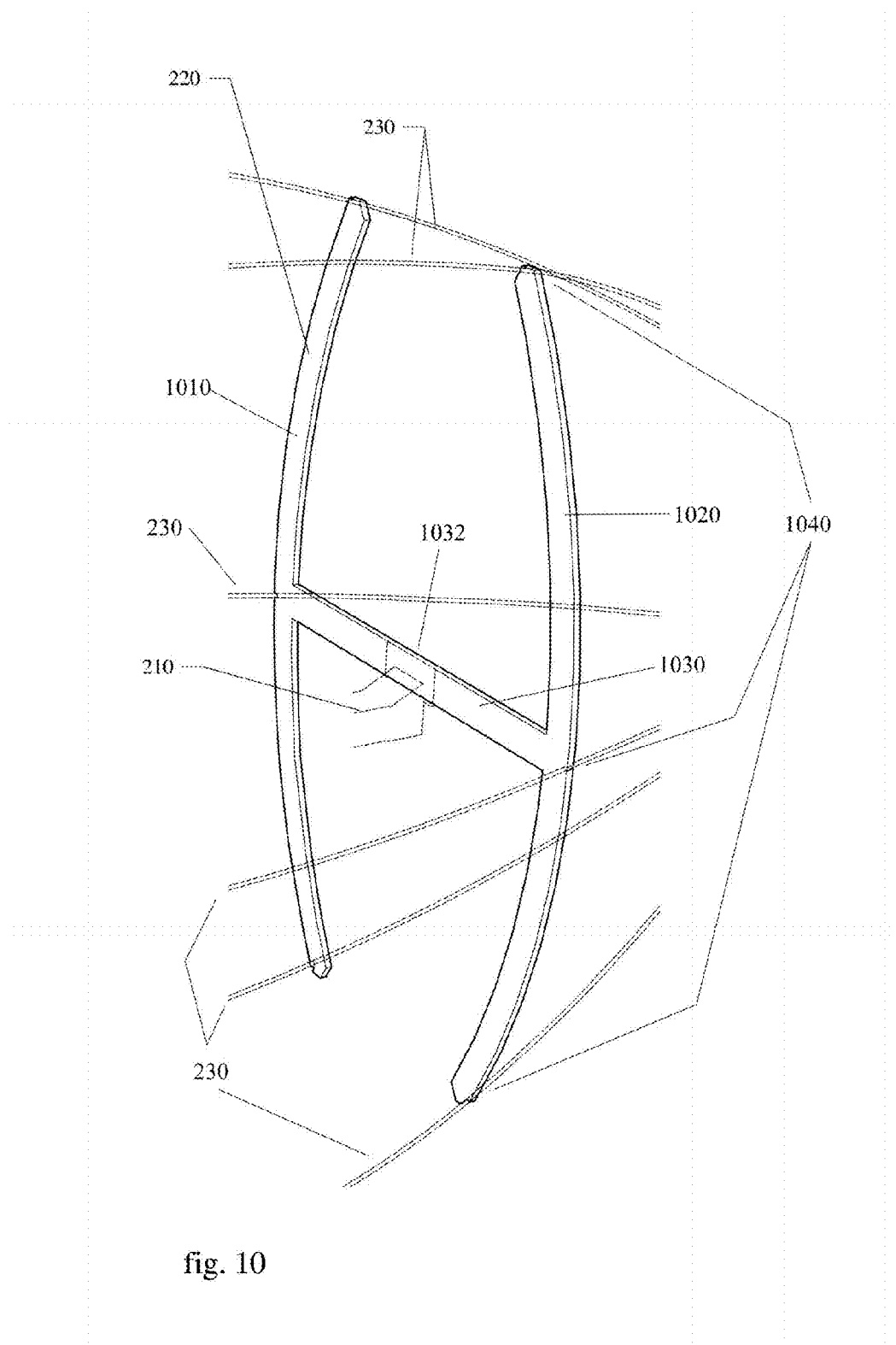
FIG. 10 illustrates a substantially "H" shaped Secondary Frame.

FIGS. 10 through 13 depict various embodiments of the Secondary Frame. FIG. 10 depicts a preferred embodiment where a forward and a rear Secondary Frame are each made of three beam elements 1010, 1020, 1030 secured to form a shape approximating the capital letter "H." The forward Secondary Frame is removably secured to a front end of the Primary Frame element at a point near the center of the horizontal Secondary Element beam 1032. Likewise, the rear Secondary Frame is removably secured to a rear end of the Primary Frame element at a point near the center of the horizontal Secondary Element beam.

In a preferred embodiment, a plurality of notches 1040 adapted to accept Tertiary Frame elements are located along the outer edges of vertical Secondary Frame beam elements 1010, 1020. In other embodiments, Tertiary Frame 230 elements may be secured by a plurality of hoods, snaps, Velcro or loops.

Figure 11:
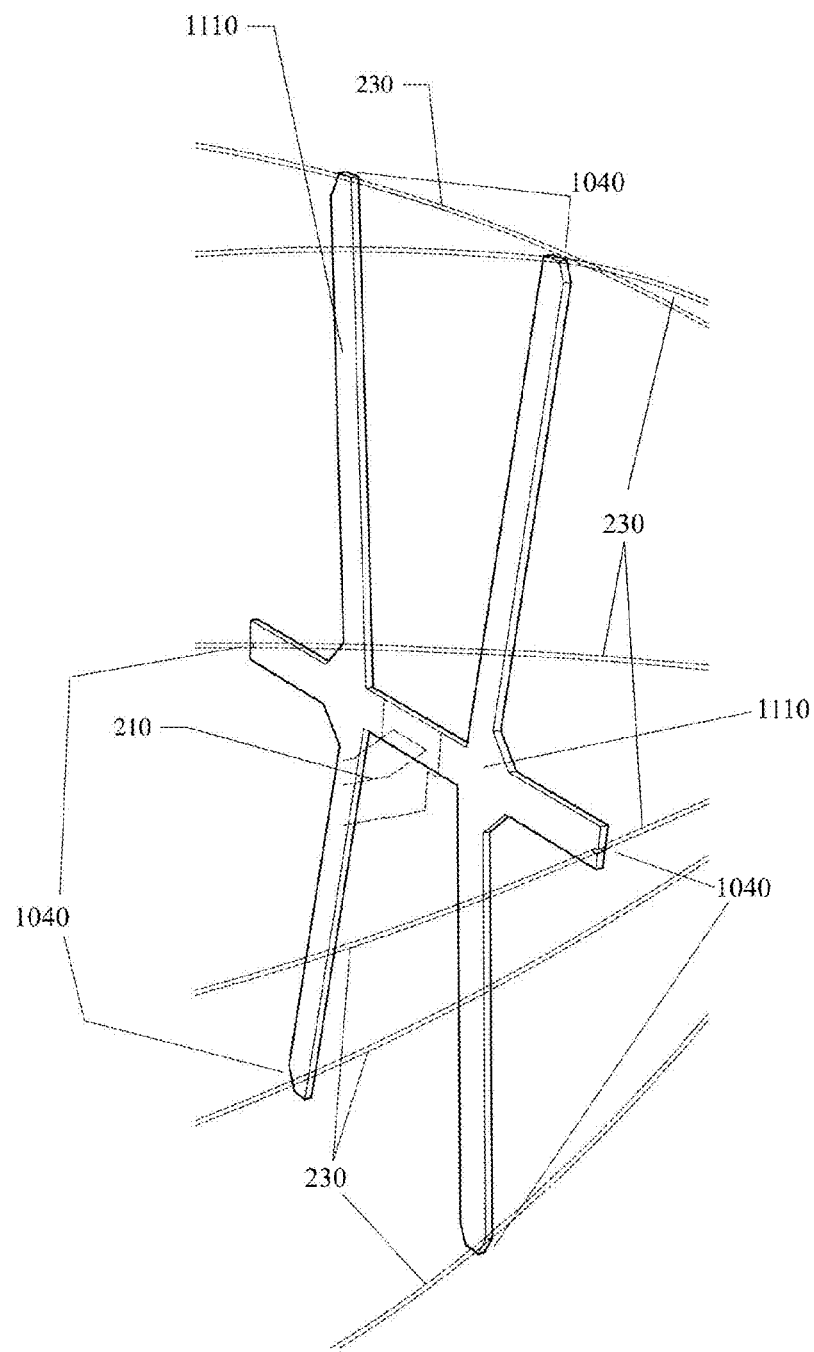
FIG. 11 illustrates a hybrid shape Secondary Frame.

FIG. 11 depicts an embodiment of the Secondary Frame where a forward and a rear Secondary Frame element 1110 each form a hybrid shape between an "H" and an "asterisk."

Figure 12:
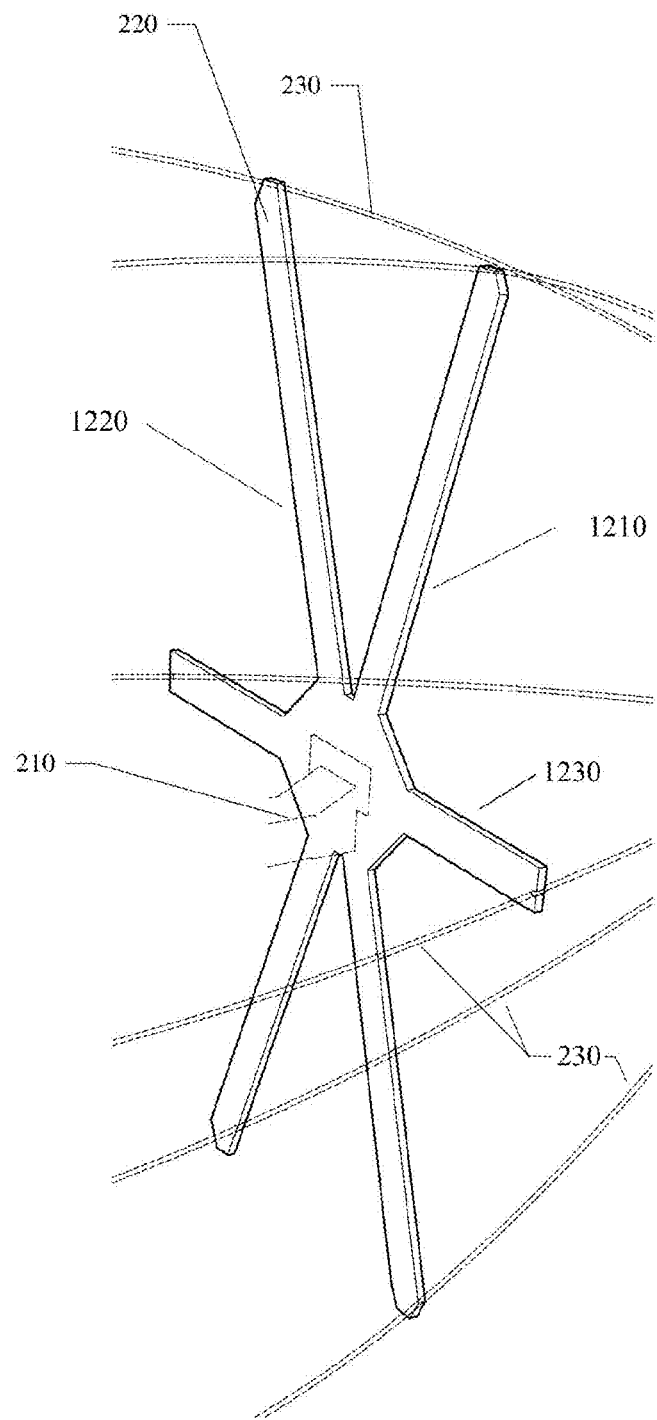
FIG. 12 illustrates an asterisk shape Secondary Frame.

FIG. 12 depicts an embodiment of the Secondary Frame 220 where a forward and a rear Secondary Frame are each made of three beam elements 1210, 1220, 1230 secured to form a shape approximating an asterisk.

Figure 13:
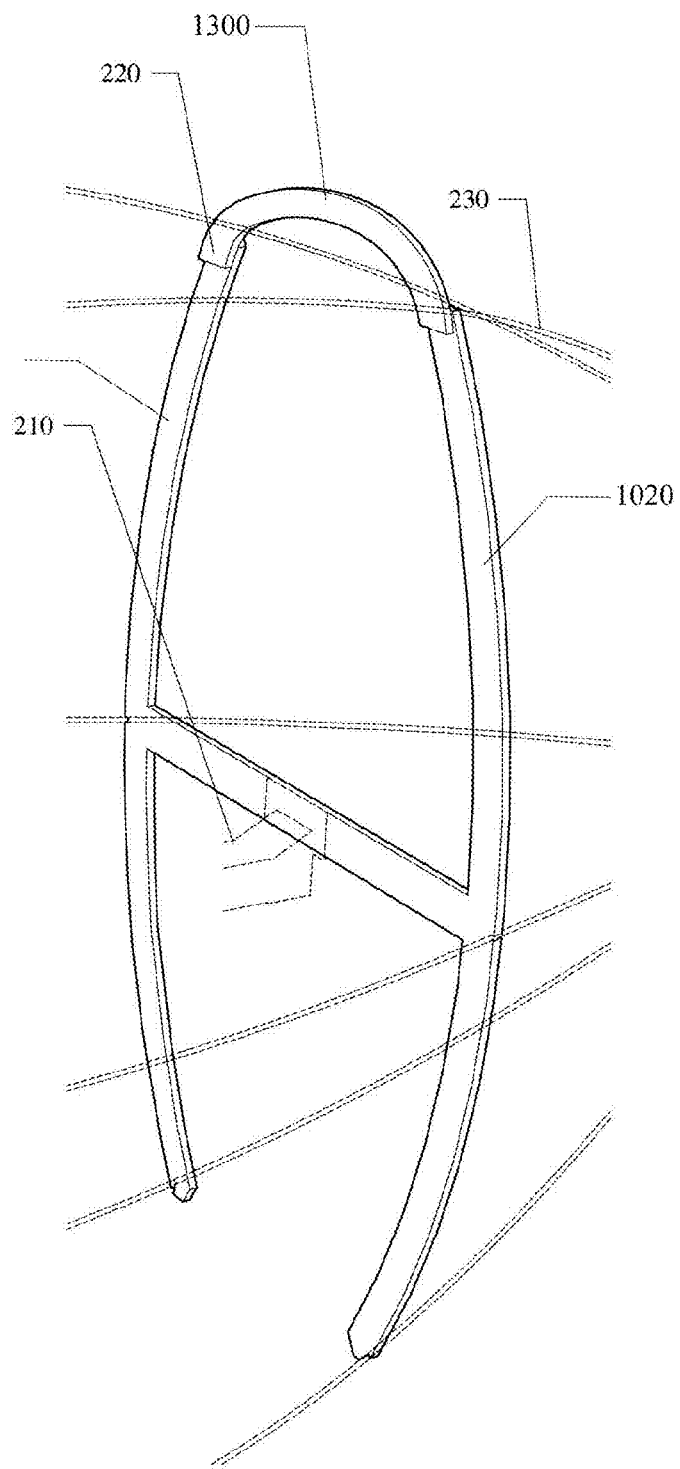
FIG. 13 illustrates a Secondary Frame with a stiffening element.

FIG. 13 depicts a substantially "H" shaped Secondary Frame with added stiffening element 1300 secured across the top. Such an element may decrease Secondary Frame flex and reduce problems with vehicle operations.

A plurality of Tertiary Frame elements 230 are removably mountable to the Primary or Secondary Frame. Tertiary Frame elements are lightweight, flexible poles. In a preferred embodiment, Tertiary Frame elements are collapsible shock-corded poles of aluminum, fiberglass, carbon fiber, or similar alloy or composite.

Figure 14:
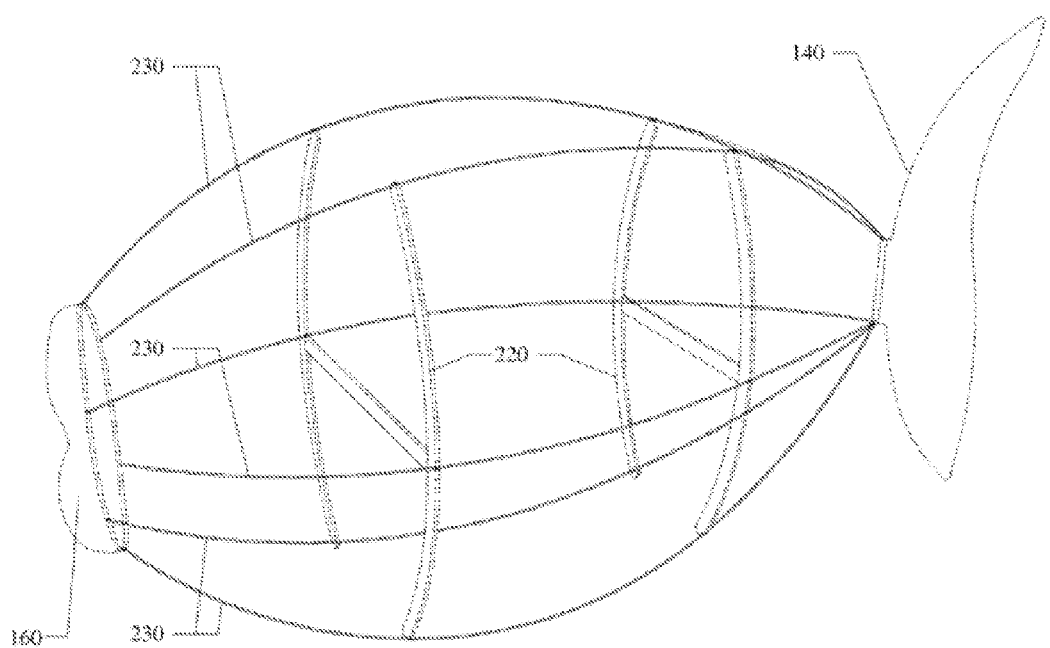
FIG. 14 illustrates a Tertiary Frame arrangement.

FIG. 14 illustrates a preferred Tertiary Frame embodiment where 6 Tertiary Frame elements 230 run from the front to rear of the Enclosure Skin 110, nearly meeting each other at the end points, and expanding away from each other at the midpoint to create room for a vehicle operator. In this embodiment, the 6 Tertiary Frame elements 230 run the length of the Primary Frame element: two on either side give shape to the bottom of the Enclosure Skin, two to the middle, and two to the top.

Figure 15:
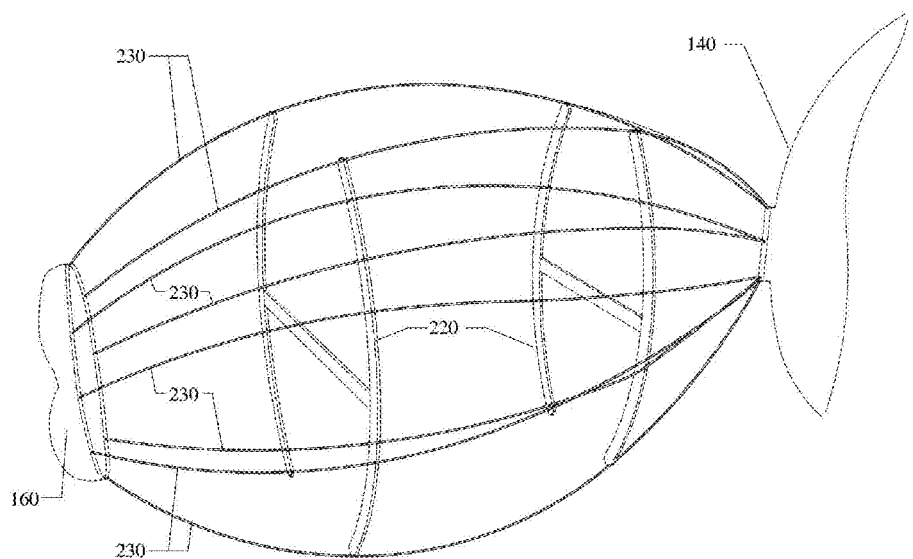
FIG. 15 illustrates a Tertiary Frame arrangement.
Figure 16:
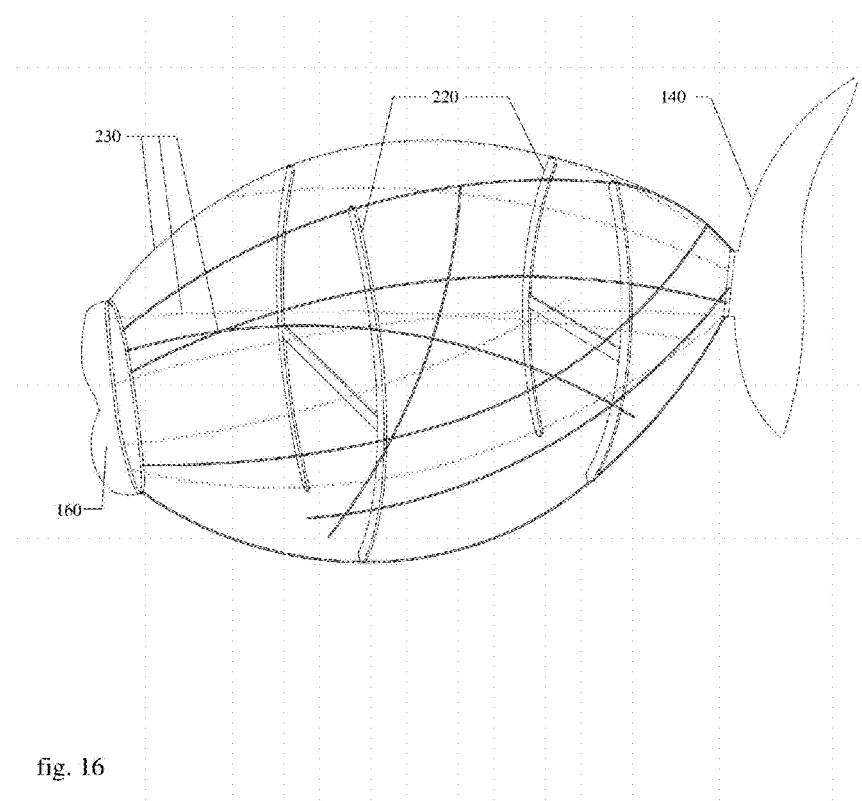
FIG. 16 illustrates an asymmetrical Tertiary Frame arrangement.

FIG. 14 illustrates a Tertiary Frame embodiment with 8 Tertiary Frame elements supporting the Enclosure Skin. FIG. 15 illustrates a Tertiary Frame embodiment where the asymmetrically arranged Tertiary Frame elements.

Figure 5:
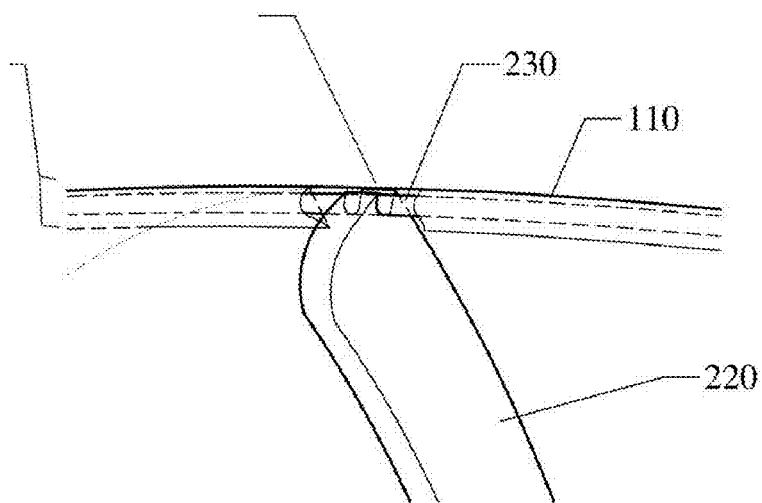
FIG. 5 illustrates a junction of Enclosure Skin to a top portion of a Secondary Frame element.
Figure 6:
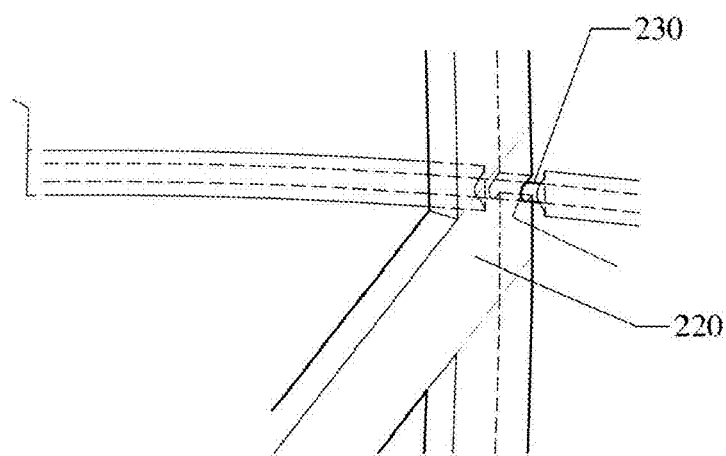
FIG. 6 illustrates a junction of Enclosure Skin to a center portion of a Secondary Frame element.
Figure 7:
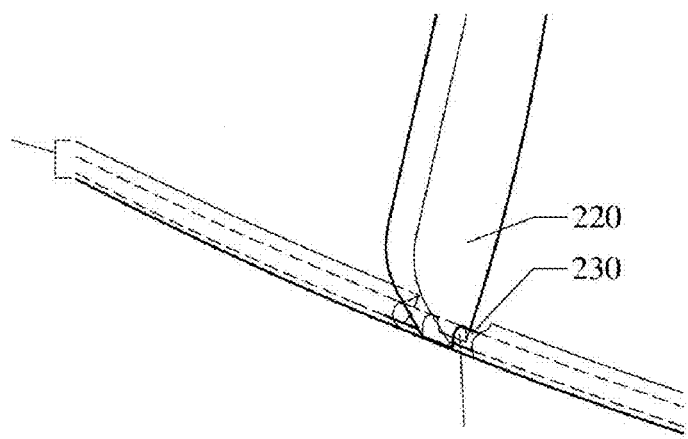
FIG. 7 illustrates a junction of Enclosure Skin a bottom portion of a Secondary Frame element.
Figure 8:
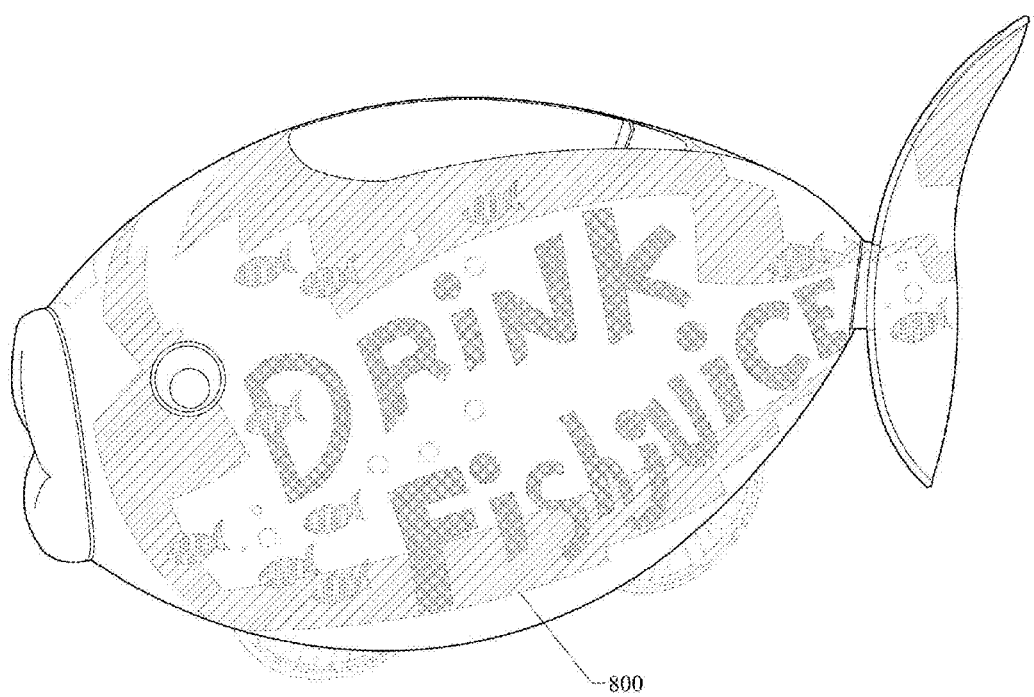
FIG. 8 illustrates the overall apparatus with "all-over graphics."

FIG. 5 depicts a top intersection between Secondary Frame 220, Tertiary Frame 230 and Enclosure Skin 110. In this embodiment, a Secondary Frame notch 1040 secures the Tertiary Frame element 230. In this embodiment, the Tertiary Frame element runs through a loop sewn into the edge of the Enclosure Skin 500. In other embodiments, Tertiary Frame elements may be secured to the enclosure skin through a plurality of hooks, loops, Velcro, snaps or similar fasteners. Likewise, FIG. 6 depicts a middle intersection between Secondary Frame 220, Tertiary Frame 230 and Enclosure Skin 110; and FIG. 7 depicts a lower intersection between Secondary Frame 220, Tertiary Frame 230 and Enclosure Skin 110.

The Tertiary Frame elements are removably mountable to a plurality of locations on the vertical members of the Secondary Frame. Tertiary Frame elements may be snapped into a series of notches along the outer surface of Secondary Frame elements 1040, or otherwise attached through a series of hooks, snaps, loops, Velcro or similar fasteners. In one embodiment, the Tertiary Frame elements are removably mountable to the ends of the Primary Frame element.

Enclosure Skin. The Enclosure Skin 110, when mounted upon a vehicle, gives the vehicle and operator a striking visual appearance. The Enclosure Skin is removably securable to the Tertiary Frame elements 230.

In a preferred embodiment, the Enclosure Skin is removably secured to the Tertiary Frame elements by a plurality of sleeves, pockets or clips. Webbing elements may be added to the nose and tail of Enclosure Skin to increase strength and distribute tension more evenly across the fabric.

In a preferred embodiment the Enclosure Skin covers most of the vehicle, while allowing only the wheels to protrude and contact the ground; and most of the rider, allowing only the head to protrude. In another embodiment, the Enclosure Skin is made out of an open woven fabric, or material similarly permeable to air, to reduce the forces applied to the frame by crosswinds.

What is claimed is:

1. A bicycle-mountable enclosure comprising,
  a. a frame adapted to securely receive bicycles of various sizes at the headtube and seattube,
  b. a plurality of armature structures removably secured to the frame and adapted to receive flexible pole elements,
  c. a plurality of flexible pole elements removably secured to the frame by the armature structure, and
  d. an enclosure skin stretched over the flexible pole elements, said enclosure skin adapted to substantially conceal a bicycle.

2. An enclosure mountable upon a vehicle, wherein said vehicle includes at least a headtube and seattube, comprising,
  a. a primary frame adapted to securely clamp to a vehicle frame at the vehicle's headtube and seattube;
  b. a rigid secondary frame wherein,
    i. a forward secondary frame element is removably secured to the primary frame in front of the headtube, and
    ii. a rear secondary frame element is removably secured to the primary frame behind the seattube, and wherein,
    iii. said secondary frame elements extend away from the primary frame, and
    iv. said secondary frame elements containing at least an outer surface;
  c. a plurality of flexible tertiary frame elements removably secured to the outer surface of the secondary frame elements; and
  d. an enclosure skin elastically secured to the tertiary frame elements, said enclosure skin adapted to substantially conceal a vehicle.

3. The vehicle-mountable enclosure of claim 2 wherein,
  a. the secondary frame elements are substantially "H" shaped, and wherein
    i. a horizontal member of a forward secondary frame element is removably secured to a front end of the primary frame, and
    ii. a horizontal member of a rear secondary frame element is removably secured to a rear end of the primary frame.

4. The vehicle-mountable enclosure of claim 2 wherein,
  a. the secondary frame elements include a plurality of notches adapted to receive the tertiary frame elements,
  b. a plurality of the flexible tertiary frame elements are removably secured to the secondary frame elements at the notches,
  c. and wherein the enclosure skin is an elastic fabric stretched over the tertiary frame elements.

5. The vehicle-mountable enclosure of claim 2, wherein the primary frame element extends from an internal forward end of the enclosure skin to the internal rear end of the enclosure skin.

6. The vehicle-mountable enclosure of claim 2, wherein the enclosure skin displays exterior graphics, information or advertisements.

7. The vehicle-mountable enclosure of claim 2 wherein,
  a. the primary frame element is made of wood, fiberglass, aluminum, carbon fiber, or similar lightweight material of sufficient stiffness to support the remaining frame members and enclosure, and
  b. the secondary frame element is made of wood, fiberglass, aluminum, carbon fiber, or similar lightweight material of sufficient stiffness to support the tertiary frame members and enclosure.

8. The vehicle-mountable enclosure of claim 7, wherein
  a. the tertiary frame elements are made of collapsible, shock-corded poles, said poles capable of sufficient elastic deflection to create an arc segment that allows for substantially unimpeded vehicle operations.

9. The vehicle-mountable enclosure of claim 8, wherein,
  a. the secondary frame elements include an upper support, a middle support and a lower support,
  b. at least one of the tertiary frame elements is removably secured to the upper support,
  c. at least one of the tertiary frame elements is removably secured to the middle support, and
  d. at least one of the tertiary frame elements is removably secured to the lower support.

10. The enclosure of claim 2 wherein the primary frame includes a first beam element and a second beam element, and wherein,
  a. said elements include a plurality of bolt sockets distributed along their length,
  b. said sockets adapted to receive bolts in a manner that provides a clamping force sufficient to secure the enclosure to said vehicle.

11. The vehicle-mountable enclosure of claim 10 wherein, the secondary frame elements are substantially "H" shaped.

12. The vehicle-mountable enclosure of claim 10 wherein, the secondary frame elements are substantially "asterisk" shaped.

13. The vehicle-mountable enclosure of claim 10 wherein, the secondary frame elements take a hybrid shape between an "asterisk" and an "H."

14. The vehicle-mountable enclosure of claim 10 wherein,
  a. the primary frame element is made of wood, fiberglass, aluminum, carbon fiber, or similar lightweight material of sufficient stiffness to support the secondary frame elements, the tertiary frame elements and enclosure, and
  b. the secondary frame elements are made of wood, fiberglass, aluminum, carbon fiber, or similar lightweight material of sufficient stiffness to support the tertiary frame elements and enclosure.

15. The vehicle-mountable enclosure of claim 11 wherein,
  a. the secondary frame elements include a plurality of notches adapted to receive tertiary frame elements, and
  b. the flexible tertiary frame elements are removably secured to the secondary frame elements at the notches.

16. The vehicle-mountable enclosure of claim 11, wherein
  a. the tertiary frame elements are made of collapsible, shock-corded poles, said poles capable of sufficient elastic deflection to create an arc segment that allows for substantially unimpeded vehicle operations.

17. The vehicle-mountable enclosure of claim 11, wherein,
a. the secondary frame elements include an upper support, a middle support and a lower support,
b. at least one of the tertiary frame elements is removably secured to the upper support,
c. at least one of the tertiary frame elements is removably secured to the middle support, and
d. at least one of the tertiary frame elements is removably secured to the lower support.

18. A vehicle-mountable enclosure comprising
a. a forward clamping structure adapted to securely receive a vehicle's headtube,
b. a rear clamping structure adapted to securely receive a vehicle's seattube;
c. a forward secondary frame adjustably secured to the forward clamping structure,
d. a rear secondary frame adjustably secured to the rear clamping structure,
e. said forward and rear secondary frames extending away from the clamping structures and containing at least an outer surface adapted to receive tertiary frame elements;
f. a plurality of tertiary frame elements removably secured to an outer surface of the secondary frame elements,
g. an enclosure skin elastically secured over the tertiary frame elements.

19. The vehicle-mountable enclosure of claim 18 wherein,
a. the secondary frame is a plurality of substantially "H" shaped beam elements, and wherein
   i. a horizontal member of a first secondary-frame-element is removably secured to a front end of the primary frame, and
   ii. a horizontal member of a second secondary-frame-element is removably secured to a rear end of the primary frame.

20. The vehicle-mountable enclosure of claim 18 wherein,
a. the primary frame element is made of wood, fiberglass, aluminum, carbon fiber, or similar lightweight material of sufficient stiffness to support the remaining frame members and enclosure, and
b. the secondary frame element is made of wood, fiberglass, aluminum, carbon fiber, or similar lightweight material of sufficient stiffness to support the tertiary frame members and enclosure.

* * * * *